July 28, 1931.  C. A. AGAR  1,815,887
PROCESS AND MACHINE FOR MAKING SPACING MEMBERS FOR SHIPPING CONTAINERS
Filed Nov. 23, 1929  4 Sheets-Sheet 1
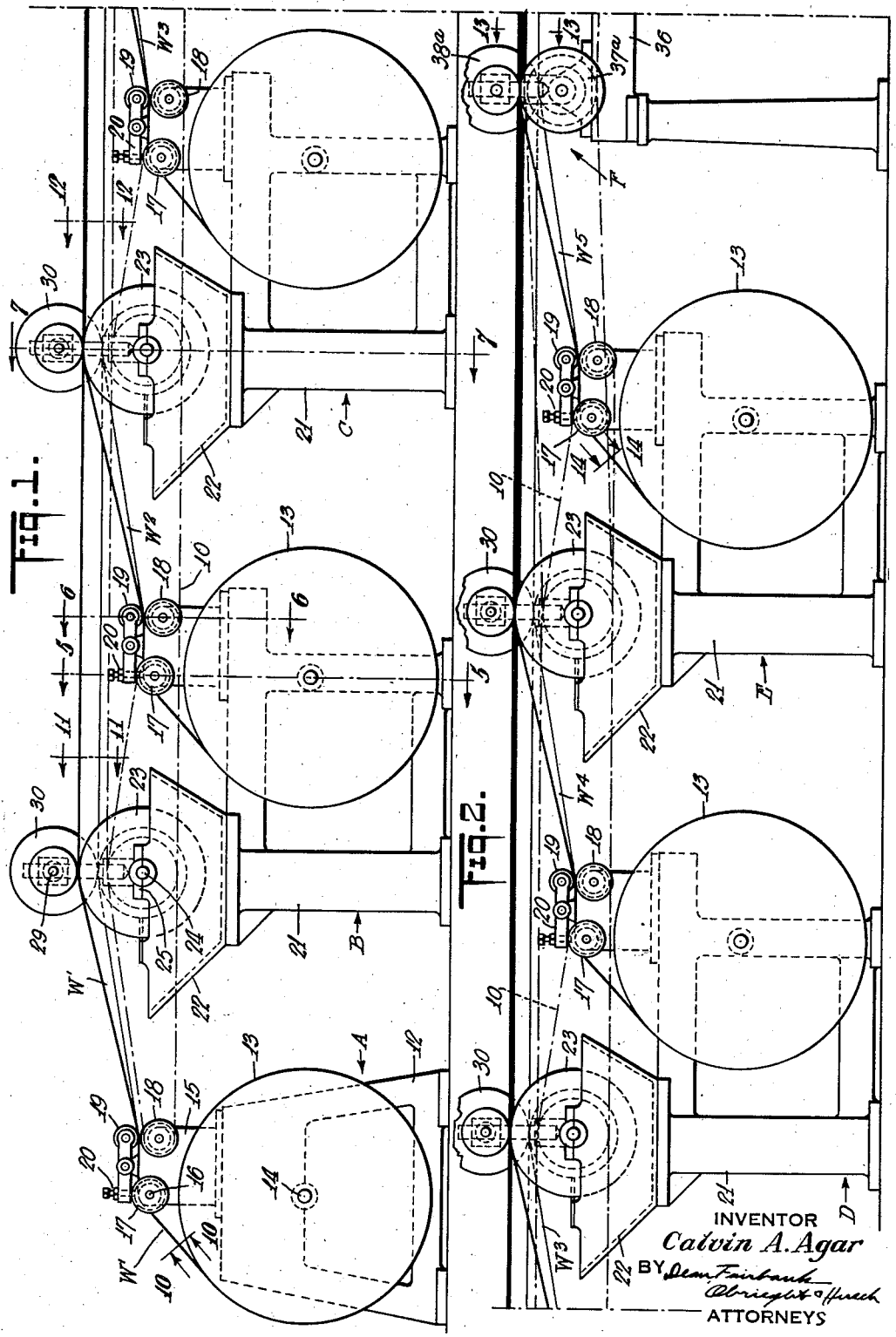
INVENTOR
Calvin A. Agar
BY
ATTORNEYS July 28, 1931. C. A. AGAR 1,815,887
PROCESS AND MACHINE FOR MAKING SPACING MEMBERS FOR SHIPPING CONTAINERS
Filed Nov. 23, 1929 4 Sheets-Sheet 2
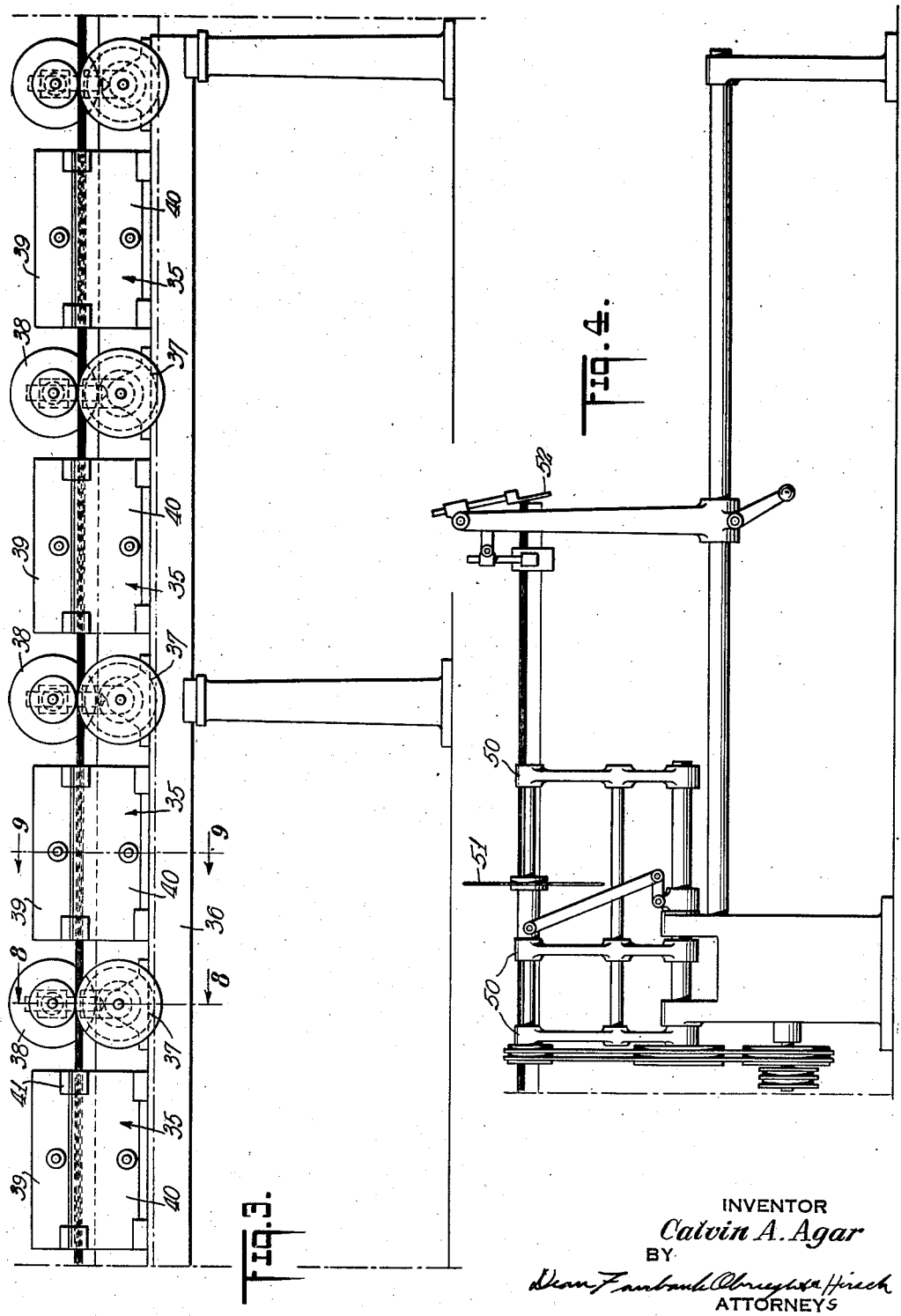
INVENTOR
Calvin A. Agar
BY
ATTORNEYS

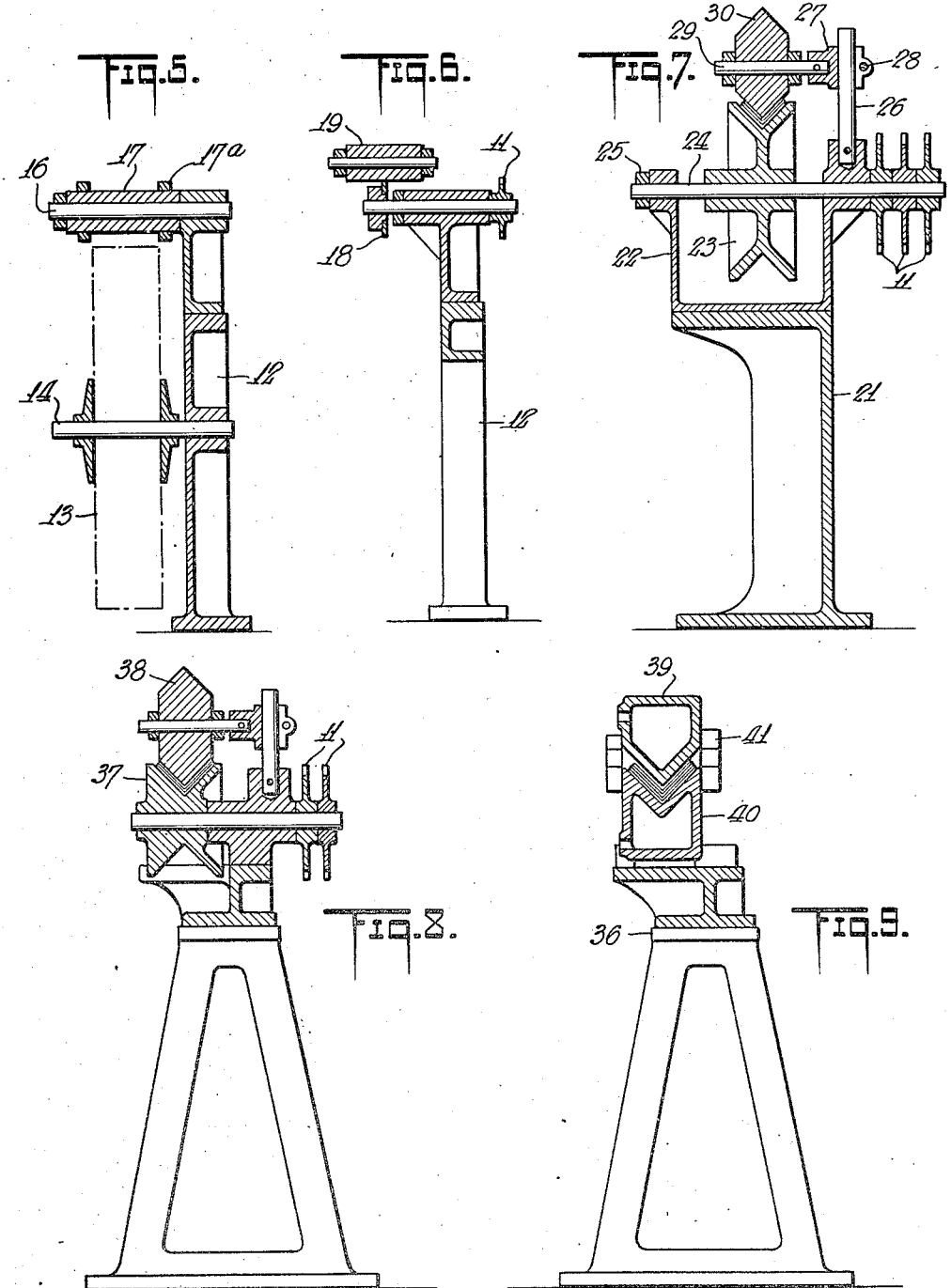

July 28, 1931. C. A. AGAR 1,815,887
PROCESS AND MACHINE FOR MAKING SPACING MEMBERS FOR SHIPPING CONTAINERS
Filed Nov. 23, 1929 4 Sheets-Sheet 4
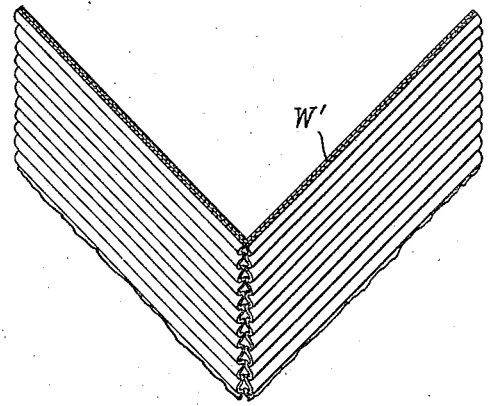
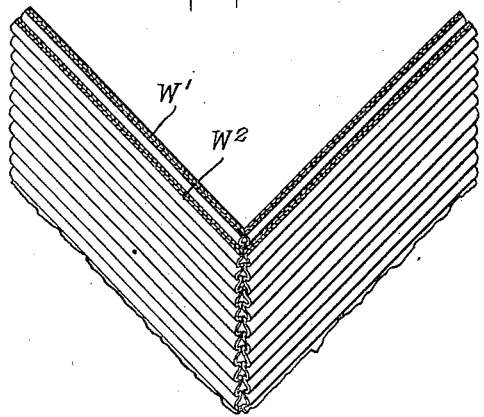
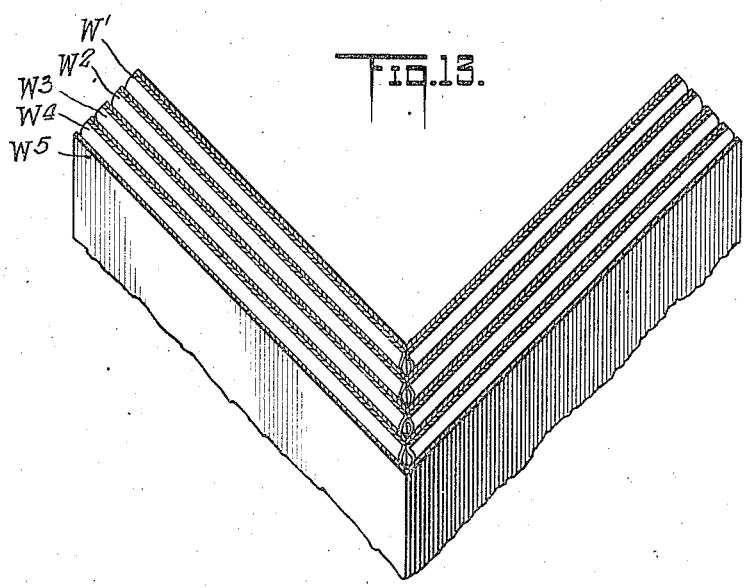
INVENTOR
Calvin A. Agar
BY
ATTORNEYS Patented July 28, 1931

1,815,887

UNITED STATES PATENT OFFICE

CALVIN A. AGAR, OF WEST ORANGE, NEW JERSEY

PROCESS AND MACHINE FOR MAKING SPACING MEMBERS FOR SHIPPING CONTAINERS

Application filed November 23, 1929. Serial No. 409,232.

My present invention is a method and apparatus for making angular members of a plurality of layers of corrugated paper or other sheet material, for various purposes, as for instance stiff reinforcing members or article supports or braces. One such article is shown in Fig. 5 of my Patent No. 1,613,152, dated January 4, 1927.

An object of my invention is to provide a series of steps whereby there are secured together separate sheets bent to angular form so that the multi-ply product will have its built up walls permanently and rigidly held at an angle to each other.

Another object is to provide an apparatus in which the machine units operate upon a plurality of paper webs to perform the separate operations of bending, adhesive applying, assembling, pressing, drying and feeding in the proper sequence and continuously so that the sheets may be fed in at one end and the finished product delivered from the other.

Another object is to provide apparatus by means of which articles of the type above mentioned or analogous articles of manufacture may be continuously, expeditiously, accurately and inexpensively manufactured from the sheet material and delivered in sections of predetermined length.

In a preferred embodiment of my improved method, separate webs of single faced corrugated board are longitudinally scored along the lines of proposed bending, and preferably transversely of the corrugations, and along the length of the webs. They are bent into the desired angular formation, and adhesive is applied to the crowns of the corrugations. These bent webs are guided into superimposed or nesting relationship with the corrugated side of one web against the facing sheet of an adjacent one, and subjected to sufficient pressure to cause adhesion between webs. Preferably a final facing strip is also bent and applied to the exposed corrugated surface of the superimposed webs. Preferably, the webs are separately scored, bent and adhesive coated and are pressed in succession against the stack of previously formed and assembled webs until the stack is built up to the desired thickness. The multi-ply strip is then subjected to pressure to set the adhesive, and is then cut into suitable lengths.

A preferred embodiment of the apparatus for carrying out this method includes supports for a series of independent rolls upon which the several single faced corrugated paper webs and final facing sheet are respectively wound. Each web may be scored as it leaves its drum, but preferably it was previously scored when it was cut to the desired width and wound in its roll. One feature of the apparatus is a combined adhesive applying and bending unit which may simply consist of a pair of rotary elements having cooperating peripheral surfaces which bend the web, the lower wheel being partially immersed in an adhesive pot and serving to apply adhesive to the crowns of the corrugations of the web during bending operation.

As a further feature there are one or more units similar to that above referred to but which serve to also assemble two or more of the webs.

Between each two pressing, bending and adhesive applying units there is delivered another scored single faced web of corrugated paper which is applied to the stack at the next pressing, bending and gluing unit. The last unit applies a facing strip and serves merely as a presser and bender. A series of heating and drying chambers receive the completely assembled strip, such driers, if desired, alternating with pairs of feeding rollers which may apply sufficient pressure to hold the web together and give tractive effect. These rollers pass the strip, which by this time is stiff and dry, to a cut off mechanism where it is severed into suitable lengths.

The invention may be more fully understood from the following description in connection with the accompanying drawings wherein:

Figs. 1, 2, 3 and 4 are somewhat diagrammatic side elevational views showing successive portions of the machine, the dot and dash line at the right of Fig. 1, at the ends of Figs. 2 and 3 and at the left of Fig. 4 indicating the lines of severance between the four figures, Figs. 5, 6 and 7 are vertical sections taken approximately on the lines 5—5, 6—6 and 7—7 respectively of Fig. 1, Figs. 8 and 9 are vertical sections taken approximately on the lines 8—8 and 9—9 of Fig. 3, Fig. 10 is a section view of a web taken on the line 10—10 of Fig. 1, Figs. 11, 12 and 13 are perspective sectional views showing the condition of the article during the various stages of its fabrication, these views being taken respectively on the lines 11—11 and 12—12 of Fig. 1 and the lines 13—13 of Fig. 2, and Fig. 14 is a sectional view of the final facing strip taken on the line 14—14 of Fig. 2.

The drawings are somewhat diagrammatic in that they do not show the details of the power driven means for effecting a uniform feed of the material or the details of the means for effecting synchronization of all of the machine units which successively act on the paper. There are, however, indicated in dotted lines various connective driving and synchronizing chains 10 for performing these functions and in Figs. 5 to 8 inclusive, a plurality of sprocket wheels 11 are shown on the mainshafts of the various units for the reception of such chains.

The construction, functions and operation of the successive series of machine units starting with the left hand end of Fig. 1 and ending with the cut off mechanism of Fig. 4 are as follows.

At the intake end of the machine there is provided a unit A consisting of a frame 12 in which a roll 13 of single faced corrugated paper W is journaled on a horizontal axle 14. A bracket 15 rising from this frame carries a horizontal spindle 16, upon which a flanged guide roller 17 is freely rotatable, the flanges 17a of this roller (see Fig. 5) being axially adjustable to accommodate webs of various widths and thereby to properly guide the web. Also mounted upon the bracket 15 there may be provided a scoring mechanism consisting of the freely rotatable scoring wheel 18 and the cooperating pressure roller 19 which is held against the scoring wheel by a conventional spring tensioning mechanism 20. This scoring mechanism is ordinarily unnecessary and is omitted because the web is preferably scored while being cut and wound on the roller.

The single faced corrugated paper web W shown in Fig. 10 is drawn with its corrugated face lowermost over the guide roller 17 and also over the scoring wheel 18, which scores it along its central longitudinal line, and thereby predetermines its future line of bending in case such line has not been previously formed. From the scorer the web is drawn to the bending and adhesive applying mechanism which forms part of the second machine unit B.

This unit includes a standard 21 supporting an adhesive pot 22. An adhesive applying wheel 23 turning on an axle 24 journaled in suitable bearings 25, at the upper edge of the pot is partially immersed in adhesive. This wheel (Fig. 7) has a concave periphery of general V shape. The particular angle of the V shape determines the angle of bending, i. e. the cross sectional shape of the reinforcing element which is to be formed. A standard 26 rising from the top of the pot 22 has a bracket 27 slidable thereon and capable of being set in any position of vertical adjustment by clamping screw 28. This bracket carries a horizontally projecting spindle 29 upon which is mounted a wheel 30 having a convex periphery which complements that of the concave wheel 23. These wheels cooperatively provide a bending mechanism and, if the roller 30 is properly adjusted, a pressing or compacting mechanism for the strip material which is drawn through them, but such pressing is not needed where only one layer is passing through.

After leaving the unit B it will be apparent that the original web W' has been bent into V shape, the corrugated layer splitting apart as an incident of such bending and that the adhesive has been applied to the crowns of the corrugations. The unit B also supports a roll of single faced corrugated paper from which the next paper web W2 is supplied and with which are associated guiding and possibly scoring mechanism which may be identical with similar mechanisms of unit A.

The third unit C is similar to unit B except that its rollers 23 and 30 are set slightly further apart in order to accommodate two thicknesses of corrugated paper since the original bent web W' with the adhesive on its under side is drawn through the bending, pressing and gluing mechanism of unit C simultaneously with the second web W2. As these webs pass through the unit C, the facing sheet of the web W2 is permanently attached to the corrugated sheet of the web W', and at the same time the web W2 is bent and brought into position, and the corrugations on its under face are coated with adhesive.

Thence the two webs glued together are passed to unit D which is another gluing, bending and pressing unit and serves to bend a third single faced web W3 from the C unit roll, to affix it to the under face of the two webs already united and to apply adhesive to its under corrugated surface. In a similar manner the three webs are passed to a unit E similar to the D unit where a fourth single faced corrugated web W4 from the supply roll of the D unit is bent, affixed to the previous plies and coated with adhesive. The roller of the E unit, however, instead of feeding a single faced corrugated web, feeds a facing sheet W5 which, if not previously scored, is scored by the scoring mechanism on the E unit and is bent and pressed against the adhesive coated under face of the preceding web W4 at unit F. Unit F differs from units B, C, D and E in that it has no adhesive pot and its complementary rollers or wheels 37a, 38a serve merely as a bending and pressing mechanism.

The strip of material which leaves the unit F is in the form of a fairly stiff, laminated angular length of stock built up of a plurality of corrugated sheets with a common facing sheet between successive corrugated sheets and with outer facing sheets. This strip is then passed over a series of steam jackets 35 or other drying or adhesive setting devices. These jackets may be mounted upon the same table 36 with the bending and pressing unit F and between successive steam jackets there are preferably pairs of cooperating feeding and pressing wheels 37 and 38 acting to progressively advance the strip.

One of the steam jackets is shown in cross section in Fig. 9. It consists merely of upper and lower steam chests 39 and 40 fixedly spaced apart as by brackets 41 and defining a generally V shaped space between them through which the multi-ply angular strip is drawn by the feed rollers 37 and 38. These feed rolls (Fig. 8) are quite similar to the rolls 23 and 30 except that the lower roll is of smaller diameter and no adhesive pot is associated with it.

From the last set of feed rolls 37, 38 the stiff laminated angular strip passes to any suitable form of cutting mechanism which is so constructed that the cutter may travel with the material during cutting operation and then return for the next cut so that the material may continuously advance. This cutting mechanism shown in Fig. 4 does not involve any novel details of construction and may be of entirely coventional type including various guide members 50 properly shaped to receive and guide the strip. The swinging movement of the cut off saw 51 is controlled by target 52 in well known manner to cause it when performing its cutting function to move laterally at the same travelling speed as the strip stock to be cut. The target is positioned to cut the strip into proper lengths for storage, shipment or use as the case may require.

The operation of the apparatus may be briefly recapitulated as follows:

The original single faced corrugated web W' is unwound from its roller 13, drawn over the guide roller 17, longitudinally scored by the wheel 18 if necessary, and drawn through the unit B where it is bent along the line of scoring and has adhesive affixed to its under corrugated face. This web, together with the next web W2 which latter has been previously scored, passes through the unit C where the second web W2 is bent, pressed against the under face of the first one, and glue applied to its surface. After the additional webs such as W3 and W4 (to any desired number) have been similarly scored, bent and affixed to the under face of the preceding webs, the final facing web W5 is applied at F and the strip stock drawn through the various heating chambers by the feed rolls 37, 38 and passed to the cut off mechanism.

Whatever pressure may be required for assuring firm adhesion of adjacent laminations may be imposed at the various adhesive applying rollers 23 and their associated pressure rollers 30. Such additional pressure as may be desirable for retaining pressure on the laminated strip stock after it has been formed and while the adhesive is setting may be applied by the feed rollers 37, 38 which pass the stock along from one steam chamber to the next and push it through the cut off mechanism. The adhesive used is preferably silicate of soda, but other adhesive might be used.

It will be apparent that while I have shown the apparatus arranged for forming the V shaped reinforcement, with its concave face uppermost, the process may be carried out equally well with the V inverted. I have also shown the webs bent to leave the corrugations on the outside. This is preferable, but not necessary as the webs might be bent the other way. The principal difference with this bending would be the fact that the corrugated paper would be crushed together along the scoring and bending line and compacted instead of split.

It will also be evident that instead of a successive series of paper scoring, bending and gluing operations, the various webs which go to make up the completed articles could be simultaneously scored, bent and coated with adhesive by independent mechanism operating on each web and that all of the webs could then simultaneously be trained through or otherwise introduced to the assembling and bending unit.

It is furthermore possible in accordance with the method to successively score, bend, apply adhesive to and cut a series of sections from a single web of corrugated paper, dispose the sections in superimposed relationship and exert pressure on them. This would be a modification of the preferred method in that the articles would be formed as separate sections instead of being made in strip form and then cut into sections.

The particular multi-ply V shaped or right angular reinforcing member which is used for illustrative purposes in the present application is one of many multi-ply paper articles which might be formed by the method. Articles of other cross section and having two or more angular bends in them, may readily be produced by the use of proper scoring, guiding and bending mechanism embodying the principles of this invention and the bending may be through a smaller or greater angle than a right angle. It will readily be understood that such articles may, in many cases, prove advantageous in reinforcing the corners of polygonal shaped boxes and irregularly shaped cartons or packing cases of many kinds, and for protecting the corners of various shaped articles.

Fig. 13 shows that the edges of the articles are squared up, that is to say, the flat terminal ends of the V are at right angles to the walls of the V. This result is accomplished by making the different webs each of the proper width. From the first web to the last one applied, the webs are of progressively increasing width so that the ends of the webs lie in a common plane at right angles to the plane of the V walls. This feature, while in some cases desirable, may in other instances, prove to be an unnecessary refinement, since for some purposes it makes no difference whether or not the edges or ends of the V are straight or oblique, or in other words whether or not the webs are of progressively increasing width or all of the same width.

Even if made with oblique edges from webs of the same width the edges may be trimmed later if desired, but this involves waste of material.

Having thus described my invention, what I claim as new and desire to secure by Letters Patent is:

1. The method of forming a stiff multi-ply angular article which includes the steps of applying adhesive to the corrugated surfaces of a plurality of single faced corrugated paper webs, bending each web to angular form, and pressing the facing sheet of each web against the corrugated face of the adjacent web with the bends in registry to effect gluing of all of the webs together in bent position.

2. The method of forming a stiff multi-ply angular article which includes the steps of applying adhesive to the corrugated surfaces of a plurality of single faced corrugated paper webs, bending each web to angular form, pressing the facing sheet of each web against the corrugated face of the adjacent web with the bends in registry to effect gluing of all of the webs together in bent position, and affixing a facing sheet to the web which would otherwise have its corrugated surface exposed.

3. A method of forming stiff multi-ply reinforcing members or the like of angular cross section, which includes the steps of bending a plurality of corrugated paper sheets along scored lines into the desired angular shape, applying adhesive to one face of each sheet, superimposing said sheets with the adhesive bearing surface of one sheet against the dry surface of an adjacent one, and exerting pressure on the superimposed stack of bent sheets to cause them to adhere together.

4. The method of forming multi-ply corrugated paper articles of angular form which includes the steps of bending a single faced corrugated web and applying adhesive to its corrugated surface, bending a similar web, pressing its facing surface against the adhesive coated corrugated surface of the preceding web to cause adhesion between the webs, applying adhesive to the corrugated face of the second sheet, bending a facing web, and applying it to the adhesive covered corrugated surface of the second web.

5. The method of fabricating stiff articles of angular cross section which includes the steps of longitudinally scoring a single faced corrugated paper web in a direction at right angles to the corrugations, bending the web along its line of scoring, and applying adhesive to its under surface, longitudinally scoring a second single faced corrugated web, bending the web along the scoring line into the same cross section as the first web, pressing the two webs together to cause them to adhere to each other in angular form, applying adhesive to the corrugated face of the second web, repeating this cycle of operations with additional single faced corrugated webs to build up the laminated strip to the desired thickness, then bending a facing sheet, and applying it to the adhesive covered surface of the last single faced sheet.

6. The method of fabricating stiff articles of angular cross section which includes the steps of longitudinally scoring a single faced corrugated paper web in a direction at right angles to the corrugations, bending the web along its line of scoring, and applying adhesive to its under surface, longitudinally scoring a second single faced corrugated web, bending the web along the scoring line into the same cross section as the first web, pressing the two webs together to cause them to adhere to each other in angular form, applying adhesive to the corrugated face of the second web, repeating this cycle of operations with additional single faced corrugated webs to build up the laminated strip to the desired thickness, then bending a facing sheet, applying it to the adhesive covered surface of the last single faced sheet, heating the united webs to set the adhesive, and severing the stiff multi-ply strip thus formed into proper lengths.

7. The process of making an article of rigid angular construction from a plurality of superposed layers of material which includes continuously advancing a plurality of webs of material, bending each web lengthwise to angular form, applying adhesive to one surface thereof, and assembling said webs and pressing them together while holding them in angular formation.

8. The process of making an article of rigid angular construction from a plurality of superposed layers of material which includes continuously advancing a plurality of webs of material, bending each web lengthwise to angular form, applying adhesive to one surface thereof, assembling said webs and pressing them together while holding them in angular formation, and cutting the continuously advancing assembly in sections of predetermined length.

9. The process of making an article of rigid angular construction from a plurality of superposed layers of material which includes continuously advancing a plurality of webs of material, bending each web lengthwise to angular form, applying adhesive to one surface thereof, assembling said webs and pressing them together while holding them in angular formation, and heating the continuously advancing assembly to set the adhesive.

10. The process of making an article of rigid angular construction from a plurality of superposed layers of material which includes continuously advancing a plurality of webs of material, bending each web lengthwise to angular form, applying adhesive to one surface thereof, and pressing the adhesive bearing surface of each web against the other surface of another web while holding and advancing the webs in the predetermined angular form.

11. The process of making an article of rigid angular construction from a plurality of superposed layers of material which includes continuously advancing a plurality of webs of material, bending each web lengthwise to angular form, applying adhesive to one surface thereof, pressing the adhesive bearing surface of each web against the other surface of another web while holding and advancing the webs in the predetermined angular form, and heating the assembly during the further continuous advance and while still holding in said angular form.

12. Apparatus for forming multi-ply angular articles including means for bending a plurality of single faced webs of corrugated paper to angular form, means to apply adhesive to one surface of each web, means to guide the webs into superimposed relationship while holding them in angular form, and means to exert pressure on the webs to cause them to adhere together.

13. Apparatus for making multi-ply angular articles including means for supporting and feeding a plurality of corrugated paper webs, means to guide the webs into superimposed relationship, means to bend them lengthwise and apply adhesive to their under surfaces and exert pressure on them to effect their adhesion.

14. An apparatus for making multi-ply angular articles including means for delivering a plurality of superposed layers of material bent lengthwise of the direction of delivery and having adhesive between said layers, a plurality of steam driers through which said layers are passed in succession, a plurality of pairs of feed rolls alternating with the driers, each drier including a pair of steam chests cooperating to define a guide passageway of angular cross section, and each pair of feed rolls complementing each other to define coacting feeding surfaces of the same angular cross section.

15. An apparatus for making multi-ply angular articles from a plurality of layers of material which apparatus includes means for continuously feeding two or more layers of material, means for folding one of said layers longitudinally and simultaneously applying adhesive to one surface thereof, and means for simultaneously folding another of said layers longitudinally, applying adhesive to one surface thereof, and pressing said last mentioned layer against the adhesive coated surface of the first mentioned layer while holding both of said layers in predetermined angular bent position.

16. An apparatus for making multi-ply angular articles which includes a pair of complementary rollers coacting to form an angular passage therebetween, means for delivering adhesive to one of said rollers, means for delivering to said rollers a longitudinally bent strip of material coated with adhesive on one surface, and means for delivering to said rollers for passage therebetween with the first mentioned layer a second layer, whereby the rollers press the two layers together and at the same time apply adhesive to one surface of the second mentioned layer.

Signed at Whippany, in the county of Morris and State of New Jersey this 21st day of November, A. D. 1929.

CALVIN A. AGAR.